(12) United States Patent
DeCusatis et al.

(10) Patent No.: US 9,596,192 B2
(45) Date of Patent: *Mar. 14, 2017

(54) RELIABLE LINK LAYER FOR CONTROL LINKS BETWEEN NETWORK CONTROLLERS AND SWITCHES

(71) Applicant: International Business Machines Corporation, Armonk, NY (US)

(72) Inventors: Casimer M. DeCusatis, Poughkeepsie, NY (US); Rajaram B. Krishnamurthy, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/833,796

(22) Filed: Mar. 15, 2013

(65) Prior Publication Data

US 2014/0269731 A1  Sep. 18, 2014

(51) Int. Cl.
*H04L 12/861* (2013.01)
*H04L 12/939* (2013.01)
(Continued)

(52) U.S. Cl.
CPC ........ *H04L 49/555* (2013.01); *H04L 43/0835* (2013.01); *H04L 47/6275* (2013.01);
(Continued)

(58) Field of Classification Search
None
See application file for complete search history.

(56) References Cited

U.S. PATENT DOCUMENTS 5,694,390 A   12/1997 Yamato
5,905,711 A    5/1999 Chiussi
(Continued)

FOREIGN PATENT DOCUMENTS

CN   101313278 A   11/2008
CN   101335710 A   12/2008
(Continued)

OTHER PUBLICATIONS

PCT Notification of Transmittal of the International Search Report and the Written Opinion of the International Searching Authority, or the Declaration, Application No. PCT/IB2014/059460; International Filing Date: Mar. 5, 2014; Date of Mailing: Jun. 30, 2014; 9 pages.

(Continued)

*Primary Examiner* — Jae Y Lee
*Assistant Examiner* — Alan Lindenbaum
(74) *Attorney, Agent, or Firm* — Cantor Colburn LLP; Steven Chiu

(57) ABSTRACT

Embodiments relate to transmission of control data between a network switch and a switch controller is provided. Aspects of the embodiments includes: configuring a plurality of control data packets by the switch controller, wherein configuring includes disposing a sequence number in each of the plurality of control data packets indicating an order of data packet transmission; storing the plurality of control data packets in a replay buffer in communication with the switch controller; transmitting the plurality of control data packets to the network switch over a secure link between the switch controller and the network switch; and responsive to determining that one or more control data packets were not received by the network switch, retrieving the one or more control data packets from the replay buffer and re-transmit- (Continued)

ting the one or more control data packets to the network switch.

15 Claims, 6 Drawing Sheets

(51) Int. Cl.
    *H04L 12/26*     (2006.01)
    *H04L 12/865*     (2013.01)
    *H04L 12/931*     (2013.01)
(52) U.S. Cl.
    CPC .......... *H04L 49/506* (2013.01); *H04L 49/557* (2013.01); *H04L 49/9057* (2013.01)

(56) References Cited

U.S. PATENT DOCUMENTS

| | | |
|---|---|---|
| 5,966,546 A | 10/1999 | Thomas |
| 6,094,418 A | 7/2000 | Soumiya et al. |
| 6,208,619 B1 | 3/2001 | Takeuchi |
| 6,356,944 B1 | 3/2002 | McCarty |
| 6,504,818 B1 | 1/2003 | Levine |
| 6,504,821 B2 | 1/2003 | Berger |
| 6,795,399 B1 | 9/2004 | Benmohamed et al. |
| 6,813,246 B1 | 11/2004 | Phan et al. |
| 6,947,380 B1 | 9/2005 | Yip et al. |
| 6,975,592 B1 | 12/2005 | Seddigh |
| 7,187,652 B2 | 3/2007 | Lee et al. |
| 7,234,073 B1 | 6/2007 | Roytman et al. |
| 7,289,453 B2 | 10/2007 | Riedel et al. |
| 7,408,876 B1 | 8/2008 | Gupta |
| 7,765,328 B2 | 7/2010 | Bryers et al. |
| 7,949,893 B1 | 5/2011 | Knaus et al. |
| 7,978,607 B1 | 7/2011 | Halabi et al. |
| 8,069,139 B2 | 11/2011 | Garbow et al. |
| 8,082,466 B2 | 12/2011 | Tanaka et al. |
| 8,429,282 B1 | 4/2013 | Ahuja |
| 8,630,307 B2 | 1/2014 | Wu et al. |
| 8,724,470 B2 | 5/2014 | Yi et al. |
| 8,762,501 B2 | 6/2014 | Kempf |
| 8,953,453 B1 | 2/2015 | Xiao et al. |
| 2001/0056459 A1 | 12/2001 | Kurose |
| 2002/0073354 A1 | 6/2002 | Schroiff et al. |
| 2002/0159386 A1 | 10/2002 | Grosdidier et al. |
| 2002/0181484 A1* | 12/2002 | Aimoto ............... H04L 12/5693 370/413 |
| 2002/0196749 A1 | 12/2002 | Eyuboglu et al. |
| 2003/0051187 A1 | 3/2003 | Mashayekhi et al. |
| 2004/0153866 A1 | 8/2004 | Guimbellot et al. |
| 2004/0170123 A1 | 9/2004 | Carpenter et al. |
| 2004/0179476 A1 | 9/2004 | Kim et al. |
| 2004/0199609 A1 | 10/2004 | Papatla et al. |
| 2004/0228278 A1 | 11/2004 | Bruckman et al. |
| 2006/0126509 A1 | 6/2006 | Abi-Nassif et al. |
| 2006/0187874 A1 | 8/2006 | Zaki |
| 2006/0203828 A1 | 9/2006 | Kumazawa |
| 2006/0209695 A1 | 9/2006 | Archer et al. |
| 2006/0215550 A1 | 9/2006 | Malhotra |
| 2007/0081454 A1 | 4/2007 | Bergamasco et al. |
| 2007/0183332 A1 | 8/2007 | Oh |
| 2007/0204266 A1 | 8/2007 | Beaty et al. |
| 2007/0220121 A1 | 9/2007 | Suwarna |
| 2007/0263540 A1 | 11/2007 | Charzinski et al. |
| 2008/0137669 A1 | 6/2008 | Balandina et al. |
| 2008/0192752 A1 | 8/2008 | Hyslop et al. |
| 2008/0225713 A1 | 9/2008 | Tychon et al. |
| 2008/0298248 A1 | 12/2008 | Roeck et al. |
| 2009/0052326 A1 | 2/2009 | Bergamasco et al. |
| 2009/0089609 A1 | 4/2009 | Baba |
| 2009/0092046 A1 | 4/2009 | Naven |
| 2009/0180380 A1 | 7/2009 | Prabhakar et al. |
| 2009/0203350 A1 | 8/2009 | Gottlieb |
| 2009/0213861 A1* | 8/2009 | Benner et al. ............... 370/400 |
| 2009/0231997 A1 | 9/2009 | Yang et al. |
| 2009/0232001 A1 | 9/2009 | Gong et al. |
| 2009/0268614 A1 | 10/2009 | Tay |
| 2010/0014487 A1 | 1/2010 | Attar et al. |
| 2010/0027420 A1 | 2/2010 | Smith |
| 2010/0027424 A1 | 2/2010 | Radunovic et al. |
| 2010/0138686 A1 | 6/2010 | Arata et al. |
| 2010/0142539 A1 | 6/2010 | Gooch |
| 2010/0146327 A1 | 6/2010 | Takubo |
| 2010/0166424 A1 | 7/2010 | Nagarajan et al. |
| 2010/0199275 A1 | 8/2010 | Mudigonda et al. |
| 2010/0211718 A1 | 8/2010 | Gratz |
| 2010/0214970 A1 | 8/2010 | Brunner et al. |
| 2010/0238803 A1 | 9/2010 | Racz et al. |
| 2010/0238805 A1 | 9/2010 | Ludwig et al. |
| 2010/0281178 A1 | 11/2010 | Sullivan |
| 2010/0302935 A1 | 12/2010 | Zhang et al. |
| 2010/0303238 A1 | 12/2010 | Cakulev |
| 2010/0309781 A1 | 12/2010 | Wang et al. |
| 2011/0026437 A1 | 2/2011 | Roja-Cessa et al. |
| 2011/0031082 A1 | 2/2011 | Chi |
| 2011/0032821 A1 | 2/2011 | Morrill et al. |
| 2011/0085444 A1 | 4/2011 | Ko et al. |
| 2011/0090797 A1 | 4/2011 | Beecroft |
| 2011/0135305 A1 | 6/2011 | Barnard |
| 2011/0137772 A1 | 6/2011 | Davis, III et al. |
| 2011/0142450 A1 | 6/2011 | Tanzi et al. |
| 2011/0158647 A1 | 6/2011 | Solheim et al. |
| 2011/0158658 A1 | 6/2011 | Myslinski et al. |
| 2011/0179415 A1 | 7/2011 | Donnellan et al. |
| 2011/0206025 A1 | 8/2011 | Cadenas |
| 2011/0211834 A1 | 9/2011 | Ansari et al. |
| 2011/0242966 A1 | 10/2011 | Van Caenegem |
| 2011/0256865 A1 | 10/2011 | Sayeed |
| 2011/0261696 A1 | 10/2011 | Crisan et al. |
| 2011/0261831 A1 | 10/2011 | Sharma et al. |
| 2011/0271007 A1 | 11/2011 | Wang et al. |
| 2011/0273988 A1 | 11/2011 | Tourrilhes et al. |
| 2011/0283016 A1 | 11/2011 | Uchida |
| 2011/0286324 A1 | 11/2011 | Bellagamba et al. |
| 2011/0292830 A1 | 12/2011 | Yanggratoke et al. |
| 2011/0295996 A1 | 12/2011 | Qiu |
| 2011/0299389 A1 | 12/2011 | Mau et al. |
| 2011/0305167 A1 | 12/2011 | Koide |
| 2011/0305288 A1 | 12/2011 | Liu et al. |
| 2012/0008958 A1 | 1/2012 | Dahlfort et al. |
| 2012/0014284 A1 | 1/2012 | Ranganathan et al. |
| 2012/0014693 A1 | 1/2012 | Cheng et al. |
| 2012/0020361 A1 | 1/2012 | Ueno |
| 2012/0023231 A1 | 1/2012 | Ueno |
| 2012/0030306 A1 | 2/2012 | Kami |
| 2012/0054079 A1 | 3/2012 | Hayashi |
| 2012/0063316 A1 | 3/2012 | Ghanwani et al. |
| 2012/0163175 A1 | 6/2012 | Gupta |
| 2012/0170477 A1 | 7/2012 | Hieda |
| 2012/0195201 A1 | 8/2012 | Ishikawa |
| 2012/0201140 A1 | 8/2012 | Suzuki |
| 2012/0207175 A1 | 8/2012 | Raman et al. |
| 2012/0221887 A1 | 8/2012 | Hasson et al. |
| 2012/0243476 A1 | 9/2012 | Eyuboglu |
| 2012/0250496 A1 | 10/2012 | Kato |
| 2012/0287782 A1 | 11/2012 | Lv et al. |
| 2013/0003735 A1 | 1/2013 | Chao |
| 2013/0010600 A1 | 1/2013 | Jocha et al. |
| 2013/0054761 A1 | 2/2013 | Kempf et al. |
| 2013/0058345 A1 | 3/2013 | Kano |
| 2013/0124683 A1 | 5/2013 | Watanabe |
| 2013/0144995 A1 | 6/2013 | Ishii |
| 2013/0159415 A1 | 6/2013 | Kamiya et al. |
| 2013/0162038 A1 | 6/2013 | Falk et al. |
| 2013/0176850 A1 | 7/2013 | Mishra |
| 2013/0205002 A1 | 8/2013 | Wang et al. |
| 2013/0212578 A1 | 8/2013 | Garg et al. |
| 2013/0250770 A1 | 9/2013 | Zou et al. |
| 2013/0258843 A1 | 10/2013 | Kurita |
| 2013/0258847 A1 | 10/2013 | Zhang et al. |
| 2013/0266317 A1 | 10/2013 | Wang |
| 2013/0268686 A1* | 10/2013 | Wang et al. .................. 709/228 |
| 2013/0294236 A1 | 11/2013 | Beheshti-Zavareh et al. |
| 2014/0006630 A1 | 1/2014 | Cai |

(56) References Cited

U.S. PATENT DOCUMENTS

| | | |
|---|---|---|
| 2014/0010235 A1 | 1/2014 | Ueno |
| 2014/0016476 A1 | 1/2014 | Dietz |
| 2014/0016647 A1 | 1/2014 | Yoshida et al. |
| 2014/0040526 A1 | 2/2014 | Chang et al. |
| 2014/0092907 A1 | 4/2014 | Sridhar et al. |
| 2014/0108632 A1 | 4/2014 | Narasimha |
| 2014/0119193 A1 | 5/2014 | Anand et al. |
| 2014/0126907 A1 | 5/2014 | Hirth et al. |
| 2014/0169189 A1 | 6/2014 | Kalunnte |
| 2014/0178066 A1 | 6/2014 | Patel et al. |
| 2014/0192646 A1 | 7/2014 | Mir |
| 2014/0198648 A1 | 7/2014 | Kulkarni et al. |
| 2014/0258774 A1 | 9/2014 | Taylor et al. |
| 2014/0269319 A1 | 9/2014 | Decusatis et al. |
| 2014/0301204 A1 | 10/2014 | Koshimizu |

FOREIGN PATENT DOCUMENTS

| | | |
|---|---|---|
| CN | 101398770 A | 4/2009 |
| CN | 101663590 A | 2/2010 |
| CN | 101677321 A | 3/2010 |
| CN | 101997644 A | 3/2011 |
| CN | 102291389 A | 12/2011 |
| CN | 102546385 A | 7/2012 |
| CN | 102611612 A | 7/2012 |
| EP | 0876023 | 11/1998 |
| GB | 2313268 A | 5/1996 |
| JP | 2011166700 A | 8/2011 |
| WO | 9930462 | 6/1999 |
| WO | 2009113106 A2 | 9/2009 |
| WO | 2011037104 A1 | 9/2010 |
| WO | 2011037148 A1 | 3/2011 |
| WO | 2011065268 A1 | 3/2011 |
| WO | 2011118575 A1 | 9/2011 |
| WO | 2012056816 A | 5/2012 |

OTHER PUBLICATIONS

PCT Notification of Transmittal of the International Search Report and the Written Opinion of the International Searching Authority, or the Declaration, Application No. PCT/IB2014/059459; International Filing Date: Mar. 5, 2014; Date of Mailing: Jun. 30, 2014; 10 pages.

McKeown, et al. "OpenFlow: Enabling Innovation in Campus Networks". ACM SIGCOMM Computer Communication Review, 38(2), 69-74.

Yong, S. et al, "XOR Retransmission in Multicast Error Recovery". Networks, 2000 (ICON2000). Proceedings. IEEE International Conference. pp. 336-340.

Curtis, et al. "DevoFlow: Scaling Flow Management for High-Performance Netowrks". SIGCOMM'11, Aug. 15-19, 2011, Toronto, Ontario, Canada.

Egilmez, et al. "Scalable video streaming over OpenFlow networks: An optimization framework for QoS Routing". 2011 18th IEEE International Confernece on Image Processing (ICIP), 2241-2244.

El-Azzab, et al. "Slices isolator for a virtualized openflow node", (2011) First International Symposium on Network Cloud Computing and Applications (NCCA), 121-126.

Li, Z., et al. Compatible TDM/WDM PON using a Single Tunable Optical Filter for both Downstream Wavelength Selection and Upstream Wavelength Generation. IEEE Photonics Technology Letters, vol. 24, No. 10, May 15, 2012. pp. 797-799.

Liu, et al. "Open Flow-based Wavelength Path Control in Transparent Optical networks: a Proof-of-Concept Demonstration" Sep. 2011, 37th European conference and Exhibition on Optical communication (ECOC).

McKeown et al., "OpenFlow: Enabling Innovation in Campus Networks", Mar. 14, 2008, 6 pages.

Johnson, RD.et al.; "Detection of a Working Master Controller by a Slave Card"; http://www.ip.com/pubview/IPCOM000099594D; Feb. 1, 1990, 3 pages.

IBM "Software Defined Networking, A new paradigm for virtual dynamic, flexible networking," IBM Systems and Technology, Oct. 2012, 6 pages.

Anonymous; "Intelligent VM Migration Based on Relative VM Priority and Relative Suitability of Migration Target"; http://priorartdatabase.com/IPCOM/000201632; Nov. 16, 2010, 3 pages.

Anonymous; "Management framework for efficient live migration of virtual machines running migration-aware applications";http://priorartdatabase.com/IPCOM000200260; Oct. 3, 2010, 5 pages.

Pfaff, B.et al.; "Open Flow Switch Specification"; www.openflow.org/document/openflow_spec_v1.0.0.pdf; Feb. 28, 2011, 56 pages.

IBM "The automatic determination of master-slave relationship between embedded controllers by mearns of a shared hardware access switch"; http://www.ip.com/pubview/IPCOM000020741D; Dec. 11, 2003, 5 pages.

Wang et al., "Dynamic Bandwidth Allocation for Preventing Congestion in Data Center Networks," ISNN 2011, Part III, LNCS 6677, pp. 160-167, 2011.

Notification of Transmittal of the International Search Report and the Written Opinion of the International Searching Authority, or the Declaration; PCT/IB2014/059457; Mailed Jul. 1, 2014, 6 pages.

U.S. Appl. No. 13/833,886, Non-Final Office Action; filed Mar. 15, 2013; Date Mailed: Dec. 17, 2014; 32 pages.

U.S. Appl. No. 13/834,117, Non-Final Office Action; filed Mar. 15, 2013; Date Mailed: Feb. 26, 2015, 61 pages U.S. Appl. No. 13/834,502, Non-Final Office Action; filed Mar. 15, 2013; Date Mailed: Dec. 4, 2014; 37 pages.

U.S. Appl. No. 14/501,457, Non-Final Office Action; filed Sep. 30, 2014; Date Mailed: Mar. 18, 2015; 29 pages.

U.S. Appl. No. 14/501,663, Non-Final Office Action; filed Sep. 30, 2014; Date Mailed: Dec. 19, 2014; 11 pages.

U.S. Appl. No. 14/501,945, Non-Final Office Action, filed Sep. 30, 2014; Date Mailed: Jan. 5, 2015; 29 pages.

U.S. Appl. No. 14/502,043, Non-Final Office Action; filed Sep. 30, 2014; Date Mailed: Dec. 23, 2014; 17 pages.

U.S. Appl. No. 13/833,952, Non-FinalOffice Action; filed Mar. 15, 2013; Date Mailed: Nov. 3, 2014; 39 pages.

U.S. Appl. No. 13/833,886, filed Mar. 15, 2013; Final Office Action; Date Mailed: Apr. 9, 2015; 19 pages.

U.S. Appl. No. 13/833,952, Final Office Action; filed Mar. 15, 2013; Date Mailed: Apr. 16, 2015; 25 pages.

U.S. Appl. No. 14/501,663, filed Sep. 30, 2014; Final Office Action; Date Mailed: Apr. 9, 2015; 25 pages.

U.S. Appl. No. 13/834,502, Final Office Action; filed Mar. 15, 2013; Date Mailed: Jun. 29, 2015; 26 pages.

U.S. Appl. No. 14/501,457, Final Office Action; filed Sep. 30, 2014; Date Mailed: Jun. 29, 2015; 28 pages.

U.S. Appl. No. 13/833,886, filed Mar. 15, 2013; Non-Final Office Action, Date Mailed: Aug. 3, 2015; 18 pages.

U.S. Appl. No. 13/833,952, Non-Final Office Action, filed Mar. 15, 2013; Date Mailed: Aug. 5, 2015; 25 pages.

U.S. Appl. No. 14/501,945, Final Office Action: filed Sep. 30, 2014; Date Mailed: Jul. 16, 2015; 30 pages.

U.S. Appl. No. 13/834,117, filed Mar. 15, 2013; Final Office Action; Date Mailed: Jul. 17, 2015, 31 pages.

U.S. Appl. No. 13/834,117, filed Mar. 15, 2013; Non-final office Action; Date Mailed: Dec. 16, 2015; 30 pages.

U.S. Appl. No. 14/501,663, filed Sep. 30, 2014; Final office action; Date Mailed: Jan. 20, 2016; 15 pages.

U.S. Appl. No. 14/501,945, Non-final Office Action; filed Sep. 30, 21014; Date Mailed: Nov. 30, 2015; 22 pages.

\* cited by examiner

RELIABLE LINK LAYER FOR CONTROL LINKS BETWEEN NETWORK CONTROLLERS AND SWITCHES

BACKGROUND

The present invention relates to computer networks and, more specifically, to control of network switches and addressing link between switches and switch controllers in a computer network.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

In an OpenFlow network environment, switches are connected via secure links to respective controllers, in order to control switch configuration and routing. Such controllers typically provide such control via control data packets sent over the secure link, which maintain higher levels of data integrity than conventional Ethernet fabrics.

Bit errors occur due to lost or corrupted data packets, and such error rates may be elevated as networks increase in size and complexity. For example, larger data center networks (e.g., 10G Ethernet with 5000-10000, fully provisioned) typically require more switches, which implies that each packet needs to traverse more links, thus making each packet more susceptible to link bit errors. In addition, increases in link data rates can increase data rate dependent noise and elevate bit error rates.

SUMMARY

According to an embodiment, a system for transmission of control data between a network switch and a switch controller is provided. The system includes a server, a switch comprising a port coupled to the server by a link in a network, and a switch controller coupled to the switch by a secure link. The switch controller includes control logic configured to perform a method including: configuring a plurality of control data packets by the switch controller, wherein configuring includes disposing a sequence number in each of the plurality of control data packets indicating an order of data packet transmission; storing the plurality of control data packets in a replay buffer in communication with the switch controller; transmitting the plurality of control data packets to the network switch over a secure link between the switch controller and the network switch; and responsive to determining that one or more control data packets were not received by the network switch, retrieving the one or more control data packets from the replay buffer and re-transmitting the one or more control data packets to the network switch.

According to another embodiment, an apparatus for transmission of control data in a network is provided. The apparatus includes a switch controller coupled to a network switch, the switch controller including control logic configured to perform: configuring a plurality of control data packets by the switch controller, wherein configuring includes disposing a sequence number in each of the plurality of control data packets indicating an order of data packet transmission; storing the plurality of control data packets in a replay buffer in communication with the switch controller; transmitting the plurality of control data packets to the network switch over a secure link between the switch controller and the network switch; and responsive to determining that one or more control data packets were not received by the network switch, retrieving the one or more control data packets from the replay buffer and re-transmitting the one or more control data packets to the network switch.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to link level error checking and recovery of control data packets sent between network switches and network switch controllers. An embodiment of a network includes one or more switches, each connected to a network controller or switch controller configured to control the switch. In one embodiment, the controller sends control data packets to the switch to effect various configurations and routing functions. In one embodiment, the controller includes a replay data buffer that stores copies of the transmitted data packets.

An exemplary control data packet includes a sequence number indicating an order of the control data packet relative to other packets sent by the controller, and may also include a packet group or priority group identification. Information including sequence numbers is included in the link layer between the controller and the switch. An embodiment of a method includes transmitting a plurality of control packets to a network switch, each control packet including at least a sequence number in, e.g., a header portion of the data packet. The method includes determining by the controller whether the control data packets were received. If one or more control data packets were not received, the controller re-sends the missing packets. In one embodiment, the switch includes logic configured to check the sequence numbers of each control data packet and determine whether any are missing. If control packets are missing, the switch returns a reply message indicating the sequence numbers of the missing packets. In response to the reply message, the controller re-sends the packets associated with the indicated sequence numbers.

Figure 1:
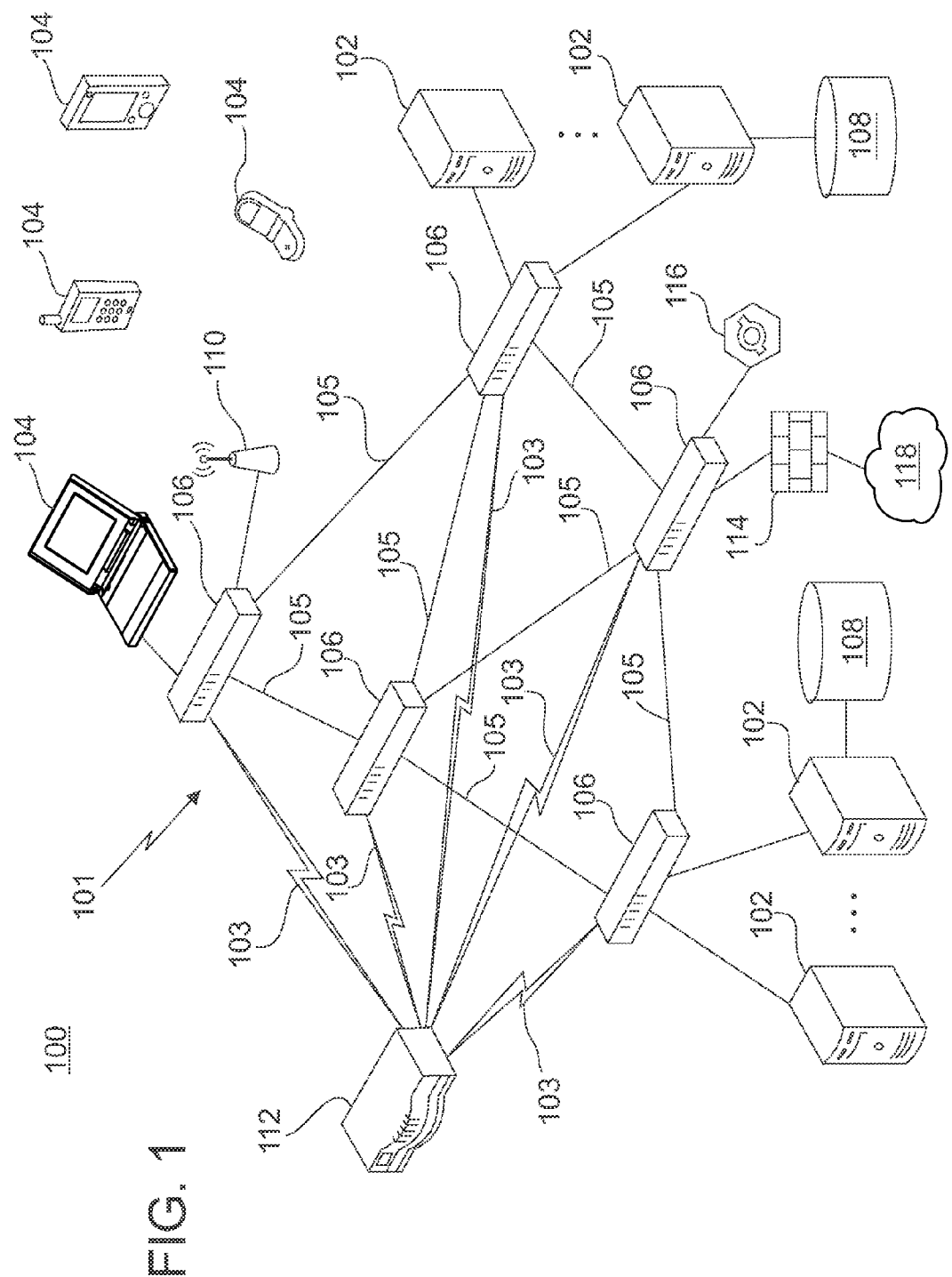
FIG. 1 depicts a block diagram of a system including a network with OpenFlow-capable switches that may be implemented according to an embodiment.

Turning now to FIG. 1, an example of a system 100 including a network 101 that supports OpenFlow will now be described in greater detail. In the example depicted in FIG. 1, the system 100 is a data center environment including a plurality of servers 102 and client systems 104 configured to communicate over the network 101 using switches 106 that are OpenFlow-capable. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may include one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes a network controller 112 that is a central software defined network controller configured to make routing decisions within the network 101. The network controller 112 establishes one or more secure links 103 to configure the switches 106 and establish communication properties of links 105 between the switches 106. For example, the network controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controller 112 can include various computer/communication hardware and software technology known in the art, such as one or more processing units or circuits, volatile and non-volatile memory including removable media, power supplies, network interfaces, support circuitry, operating systems, and the like. Although the network controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controller 112, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports OpenFlow as a layer-2 protocol. The switches 106 can be dedicated OpenFlow switches or OpenFlow-enabled general purpose switches that also support layer-2 and layer-3 Ethernet.

Figure 2:
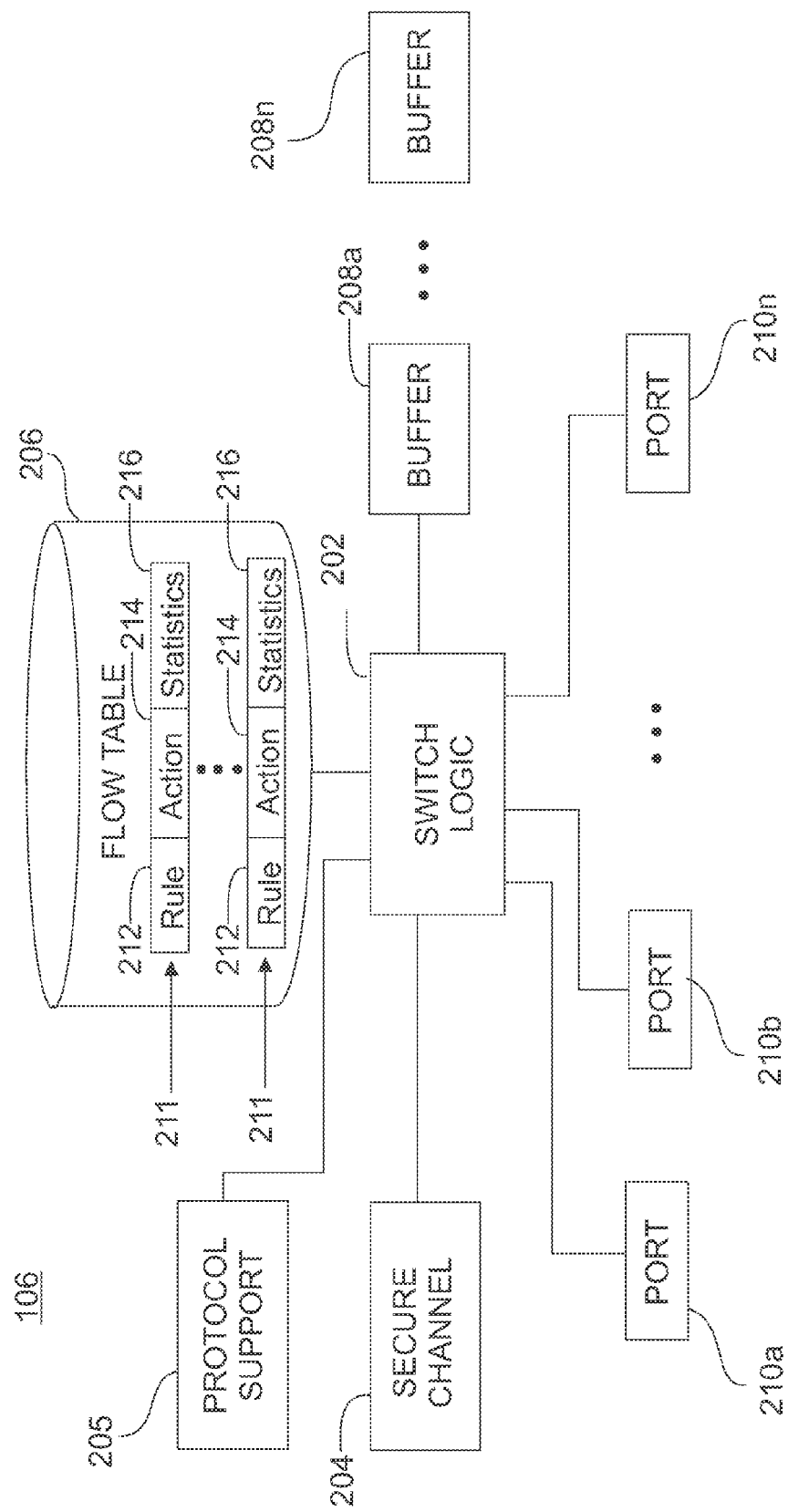
FIG. 2 depicts a block diagram of an OpenFlow-capable switch according to an embodiment.

FIG. 2 depicts a block diagram of the switch 106 of FIG. 1 that supports OpenFlow. The switch 106 includes switch logic 202, secure channel 204, protocol support 205, flow table 206, buffers 208a-208n, and ports 210a-210n. The switch logic 202 may be implemented in one or more processing circuits, where a computer readable storage medium is configured to hold instructions for the switch logic 202, as well as various variables and constants to support operation of the switch 106. The switch logic 202 forwards packets between the ports 210a-210n as flows defined by the network controller 112 of FIG. 1.

The secure channel 204 connects the switch 106 to the network controller 112 of FIG. 1. The secure channel 204 allows commands and packets to be communicated between the network controller 112 and the switch 106 via the OpenFlow protocol. The secure channel 204 can be implemented in software as executable instructions stored within the switch 106. Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The flow table 206 defines supported connection types associated with particular addresses, virtual local area networks or switch ports. A flow may be defined as all packets that match a particular header format. Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the network controller 112 of FIG. 1, and dropping packets of the flow. Entries 211 in the flow table 206 can be added and removed by the network controller 112 of FIG. 1 via the secure channel 204. The network controller 112 of FIG. 1 can pre-populate the entries 211 in the flow table 206. Additionally, the switch 106 can request creation of an entry 211 from the network controller 112 upon receiving a flow without a corresponding entry 211 in the flow table 206.

The buffers 208a-208n provide temporary storage in queues for flows as packets are sent between the ports 210a-210n. In a lossless configuration, rather than dropping packets when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

Figure 3:
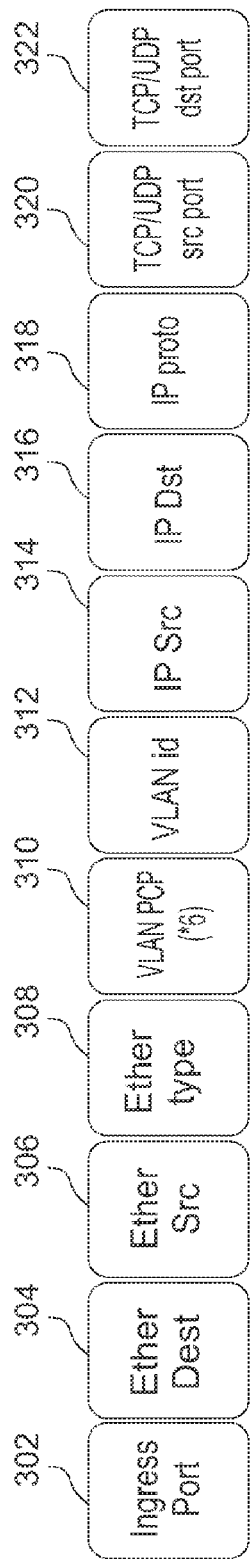
FIG. 3 depicts an example of an OpenFlow flow switching definition that can be used in embodiments.

FIG. 3 depicts an example of an OpenFlow flow switching definition 300 that can be used in embodiments. The OpenFlow flow switching definition 300 is a packet header that defines the flow and includes a number of fields. In this example, the switching definition 300 is a flow header that includes up to eleven tuples or fields; however, not all tuples need to be defined depending upon particular flows. In the example of FIG. 3, the OpenFlow flow switching definition 300 includes tuples for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, and a TCP/UDP destination port 322. The Ethernet destination address 304 may represent a layer-2 Ethernet hardware address or media access control (MAC) address used in legacy switching and routing. The IP destination address 316 may represent a layer-3 IP address used in legacy switching and routing. Flow switching can be defined for any combination of tuples in the OpenFlow flow switching definition 300, with a particular combination of tuples serving as a key. For example, flows can be defined in a rule 212 of FIG. 2 by exact matching or wildcard matching for aggregated MAC-subnets, IP-subnets, ports, VLAN identifiers, and the like.

Figure 4:
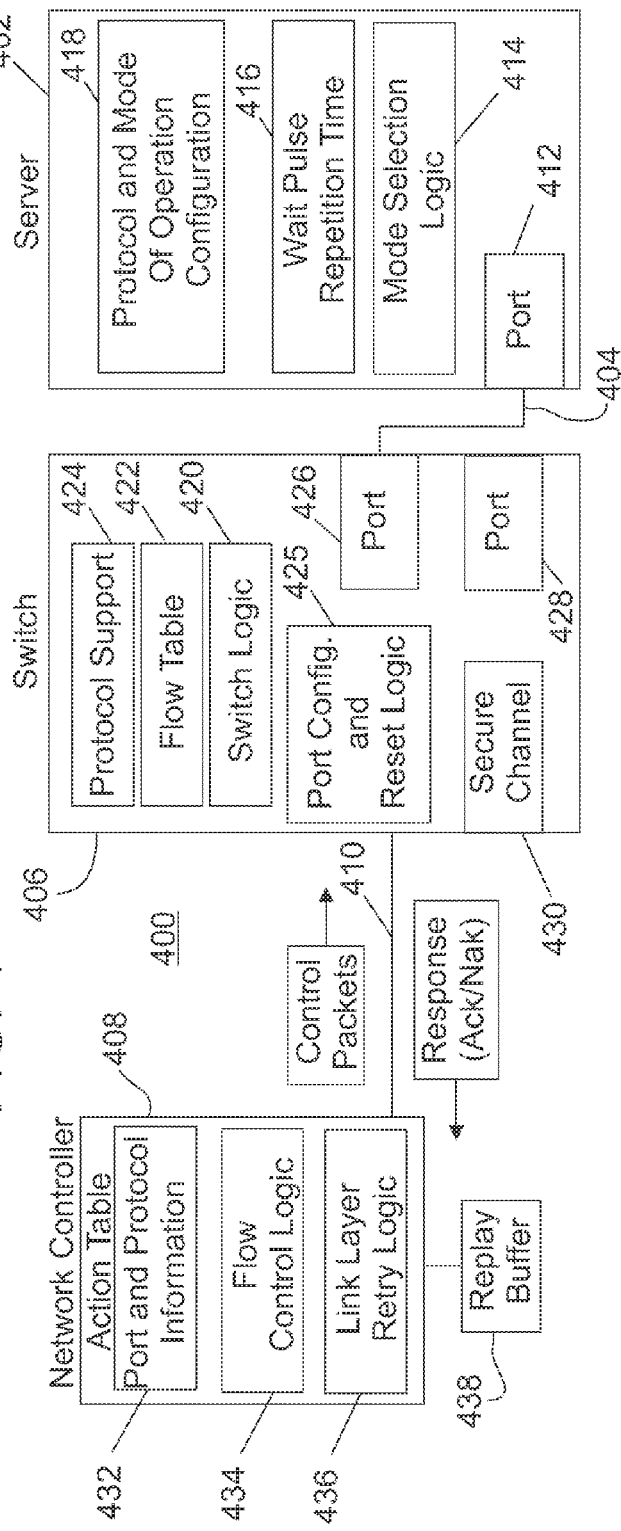
FIG. 4 depicts an exemplary embodiment of a portion of a network including a network switch and a switch controller.

FIG. 4 depicts a block diagram of a network portion 400. A server 402 is coupled by a link 404 to a switch 406. An exemplary server 402 is a server 102 of FIG. 1, and an exemplary switch 406 is a switch 106 of FIG. 1. A controller 408 (e.g., a network controller) is linked to the switch 406 by, e.g., a secure link 410. In one embodiment, in OpenFlow-capable environments, the controller is a network controller such as network controller 112 of FIG. 1. In other embodiments, for non-OpenFlow environments, functions of the controller 408 can be integrated into other network entities such as the server 402 or server 102.

As shown in FIG. 4, the switch 406 is connected to the server 402, which includes at least one port 412 and various logical components such as mode selection logic 414, wait pulse repetition time 416, and protocol and mode of operation configuration 418. Logical components described herein can be implemented in instructions stored in a computer readable storage medium for execution by a processing circuit or in hardware circuitry, and can be configured to send frames such as link initialization frames and data packets. The switch 406, server 402 and controller 408 may support a number of modes of operation including, but not limited to, Ethernet, Fibre Channel, Fibre Channel over Ethernet (FCoE), Internet Wide Area Remote direct memory access Protocol (iWARP), and Remote direct memory access over Converged Ethernet (RoCE).

The switch 406 includes switch logic 420, flow table 422, protocol support 424, port configuration and reset logic 425 and multiple ports, such as port 426 for communicating with the server 402 and port 428 for communicating with other network entities such as other switches or servers. The ports may be physical ports, virtual ports defined by the switch, and/or a virtual port defined by the OpenFlow protocol. When implemented as an OpenFlow switch, the switch 406 also includes a secure channel 430 for communicating with the network controller 408 on secure link 410.

The network controller 408 includes an action table 432 that holds port and protocol information for the switch 406, as well as rules, actions, and statistics for flows through the switch 406 and other switches, such as switches 106 of FIG. 1. The network controller 408 also includes flow control logic 434 that can be implemented in instructions stored in a computer readable storage medium for execution by a processing circuit or in hardware circuitry. The network controller 408 can manage updates of the flow table 422 in the switch 406. Based on the updating of the flow table 422, the port and protocol information in the action table 432 of the network controller 408 is updated to reflect the changes.

As indicated above, the network controller 408 communicates with the switch 406 via a secure link 410 established using a specified port, such as a port in a physical network controller 112 or a controller implemented in other processors, such as a server 102 or client system 104. The network controller 408 communicates with the switch 406 to configure and manage the switch, receive events from the switch and send packets out the switch. Various message types can be sent between the switch and the controller to accomplish such functions, including controller-to-switch, asynchronous and symmetric messages.

Controller-to-switch messages are initiated by the controller 408 and may or may not require a response from the switch 406. Features messages are used to request the capabilities of the switch 406 (e.g., upon establishment of the secure link), in response to which the switch 406 should return a features reply that specifies the capabilities of the switch 406. Configuration messages are sent by the controller 408 to set and query configuration parameters in the switch 406. The switch 406 only responds to a query from the controller 408. Modify-State messages are sent by the controller 408 to manage state on the switches, e.g., to add/delete and/or modify flows/groups in the flow table 422 and to set switch port properties. Read-State messages are used by the controller to collect statistics from the switch. Packet-out messages are used by the controller to send packets out of a specified port on the switch, and to forward packets received via Packet-in messages. Packet-out messages contain a full packet or a buffer ID referencing a packet stored in the switch. Packet-out messages also contain a list of actions to be applied in the order they are specified; an empty action list drops the packet.

Asynchronous messages are sent without the controller 408 soliciting them from the switch 406. The switch 406 sends asynchronous messages to the controller 408 to, e.g., denote a packet arrival, switch state change, or error. A packet-in event message may be sent to the controller 408 from the switch 406 for packets that do not have a matching flow entry, and may be sent from the controller 408 to the switch 406 for packets forwarded to the controller 408. Flow-removed messages are used to indicate that a flow entry has been removed due to, e.g., inactivity or expiration of the flow entry. Port-status messages are sent in response to changes in port configuration state and port status events. Error messages may be used by the switch 406 to notify the controller 408 of problems.

Symmetric messages are sent without solicitation, in either direction. Hello messages may be exchanged between the switch 406 and controller 408 upon connection startup. Echo request/reply messages can be sent from either the switch 406 or the controller 408, and can be used to measure the latency or bandwidth of a controller-switch connection, as well as verify its liveness. Experimenter messages provide a way for the switch 406 to offer additional functionality within the OpenFlow message type space.

The controller 408 includes a link layer reliability or link layer retry (LLR) capability that is provided to maintain data integrity at the link 410 (physical layer) between the controller 408 and the switch 406. This feature is implemented by including in, e.g., the port and protocol information 432, control packet format information that includes a field for a sequence number assigned to each control packet that is sent to the switch 406. The controller 408 includes LLR logic 436 configured to assign a sequence number to each data packet and may group multiple data packets into a grouping such as a common traffic class. The traffic class may be assigned a priority to be recognized by the switch 406. The controller 408 may also be configured to provide LLR response codes or formats. LLR may be implemented in existing hardware structures and link protocols. For example, LLR can be implemented via enhanced transmission selected (ETS) flow control for CEE embodiments.

The controller 408 also includes a replay buffer 438 that stores the sequenced data packets to be transmitted to the switch 406. Control data packet groups are assigned sequence numbers, and may also be assigned a traffic or priority class, and are stored in the replay buffer. The group is then sent to the switch 406 in a transmission order as defined by the sequence numbers.

In one embodiment, the replay buffer size is configured to encompass the length of the link 410, reply (e.g., Ack/Nak) processing time at both ends of the link 410, and maximum transmission and reception times (the entire packet is received by the switch to error check and verify control packets, and thus sending a Ack/Nak packet may have to wait on a control packet). For example, for a 10G data link have a 100 meter length, it is estimated that the header overhead requires about 9 K bytes; for longer distances the length may increase, e.g., may extend up to 32 K bytes.

In one embodiment, the replay buffer 438 is implemented independent of other buffers. For example, implementation of the replay buffer 438 is independent of virtual lane (VL) buffering and avoids intersections with VL buffering. VL buffers are typically implemented in the inbound path (from switch to controller) and are used exclusively for flow control. LLR provides a separate outbound replay buffer that is able to re-transmit lost packets, including those that never get to the VL buffers. Thus, link reliability can be assured independent of VLs or other flow buffers.

OpenFlow control communications may run much faster than switch flow control, inducing control packet loss if switch buffer overflows. Thus, in one embodiment, the control 408 utilizes back-pressure flow control. The back-pressure flow control allows loss-free transmission by having gateways verify that the next gateway has sufficient buffer space available before sending data.

The switch 406 is configured to check for LLR capability, verify packets and packet sequences and return LLR responses based on the verification. This configuration may be embodied, e.g., in the switch logic 420. The switch 406 can check for LLR capability and verify the sequence numbers to determine whether data packets are missing.

For example, as the switch 406 receives a group of control data packets from the controller 406. The switch 406 recognizes the traffic class (if one is assigned) and verifies that all data packet sequence numbers are accounted for. If so, the switch 406 sends an acknowledge (Ack) reply indicating that the group of packets were successfully received. If it is determined that sequence numbers are missing (e.g., numbers in the sequence are missing), the switch 406 sends a negative-acknowledge (Nak) reply that indicates the sequence numbers that were not received (e.g., within timeout period). The controller 408 may then determine the missing data packets from the indicated sequence numbers and re-send the missing data packets from the replay buffer 438 to the switch 406.

The LLR system provides for rapid end-to-end recovery in the event that control packets are lost and provides a mechanism by which a switch can rapidly identify lost packets, send notification and initiate a retry of the lost packets without requiring full end-to-end retries.

Figure 5:
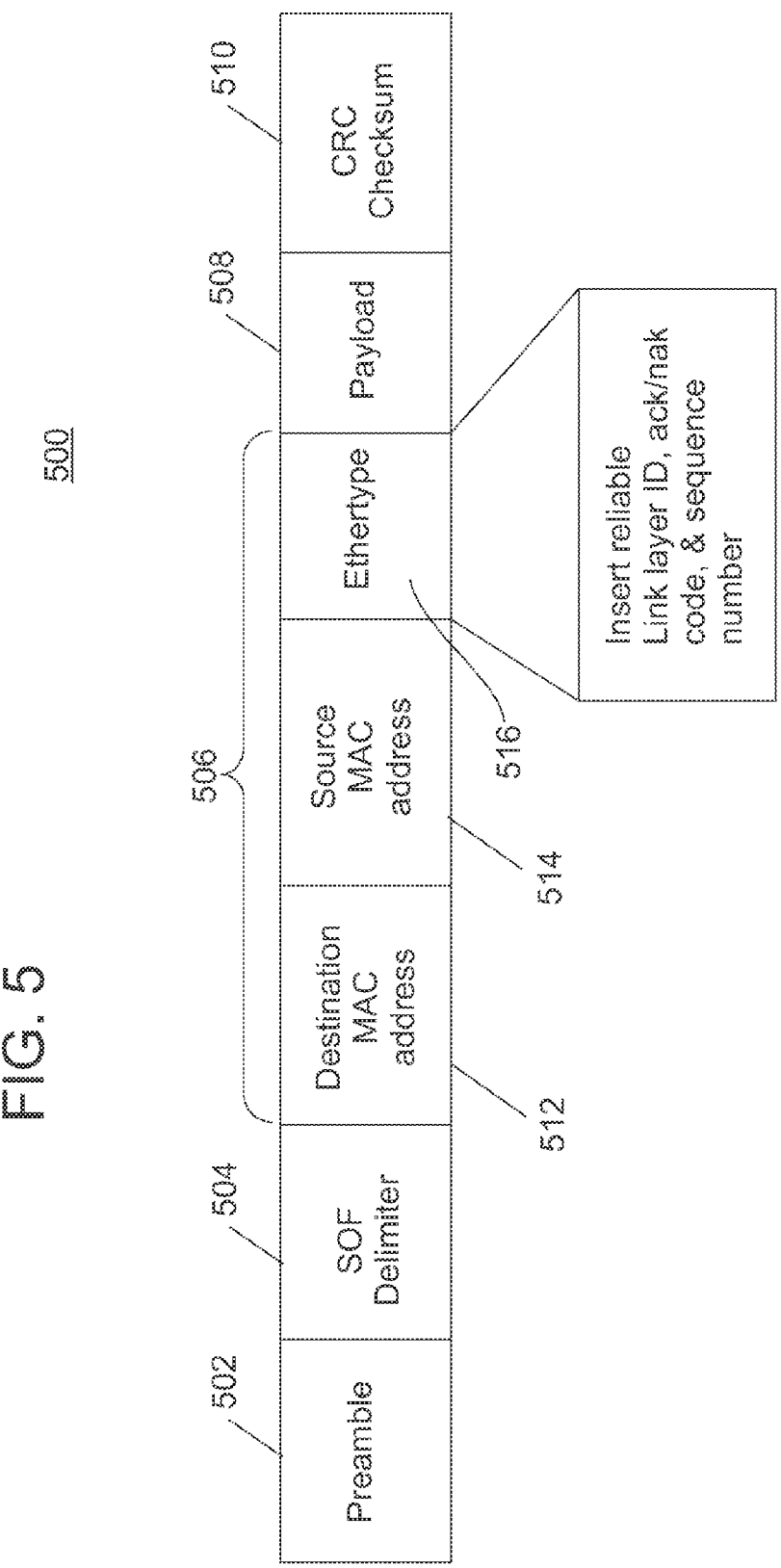
FIG. 5 depicts an example of a control data packet sent from the controller to the switch of FIG. 4.

FIG. 5 depicts an embodiment of a control data frame or control data packet 500 used to send data between the controller 408 and the switch 406. The control data frame may be used by the controller 408 to communicate with the switch 406 to, e.g., configure and manage the switch and flow tables, send data packets including customer data to the switch, and manage packet routing through the switch. Exemplary control frames include controller-to-switch, asynchronous and symmetric messages as described above. In this embodiment, LLR enablement and initialization codes, priority group IDs, Ack/Nak codes and sequence numbers are located in the control packet header, although the format of providing such information is not limited to the specific embodiments described herein.

The frame 500 includes a preamble 502, a start of frame (SOF) delimiter 504, a header 506, payload data 508 and a cyclic redundancy check (CRC) checksum 510. The header 506 includes network address information and protocol information, in which LLR information may be specified. For example, the frame 500 includes a destination MAC address 512, a source MAC address 514 and an Ethernet type field 516. The Ethertype field 516 includes at least a sequence number identifying the order in which the frame 500 is sent relative to other frames. The Ethertype field 516 may also include LLR group ID indicating if the frame 500 is part of a common traffic group or priority group and/or Ack/Nak codes. In one embodiment, the LLR information is added to existing frame formats and protocols. A new delimiter may be added to indicate additional bytes identifying LLR information such as the group and/or sequence number.

It is noted that the frame 500 and the header 506, and their respective fields, are not limited to the specific embodiments described herein. For example, the header 506 may include different or additional fields depending on protocols used. In one example, the header 506 may include any number of fields as described with reference to the switching definition 300.

Figure 6:
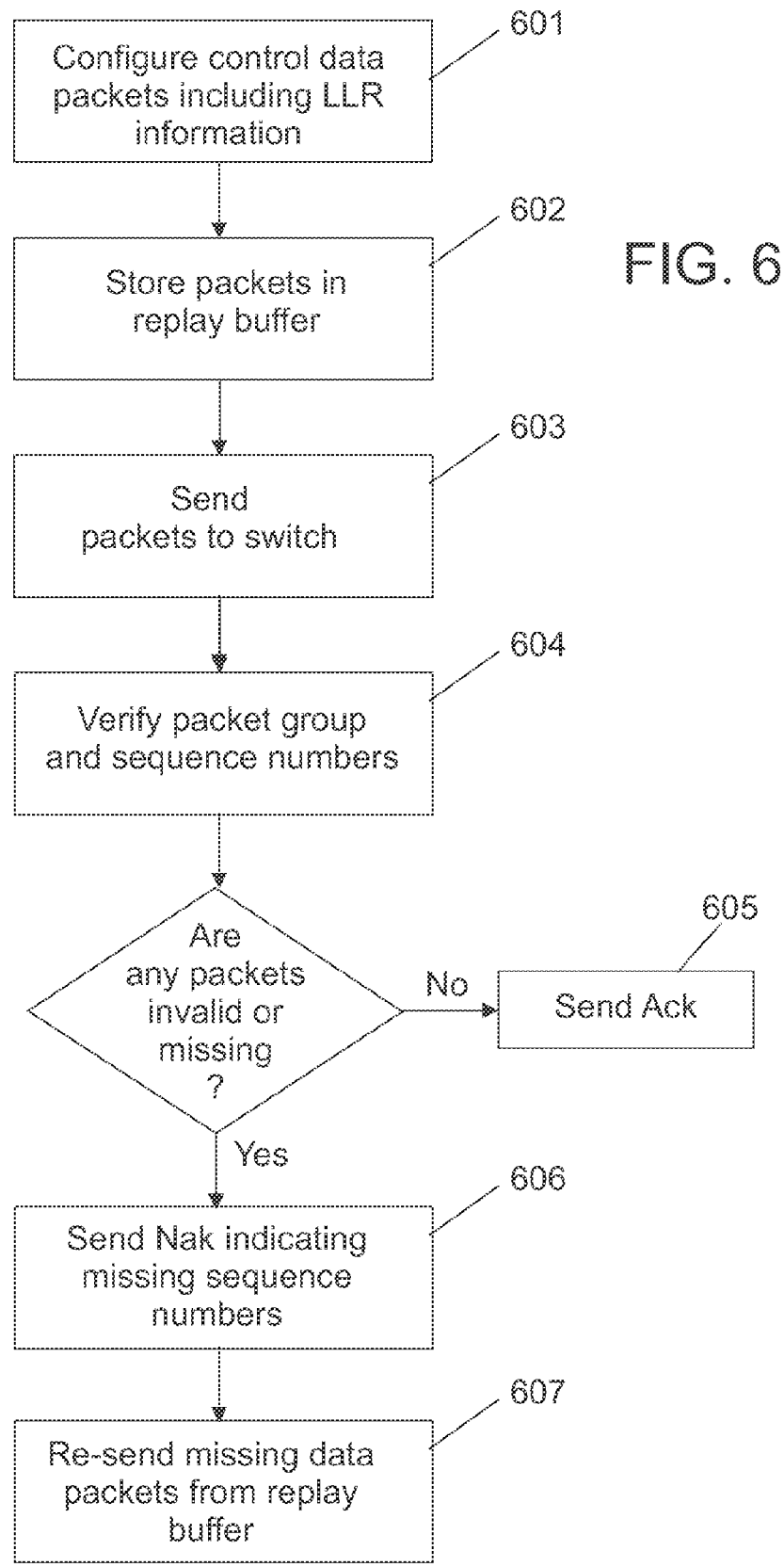
FIG. 6 is a flow diagram showing a method of communicating between a controller and a network switch.
Figure 7:
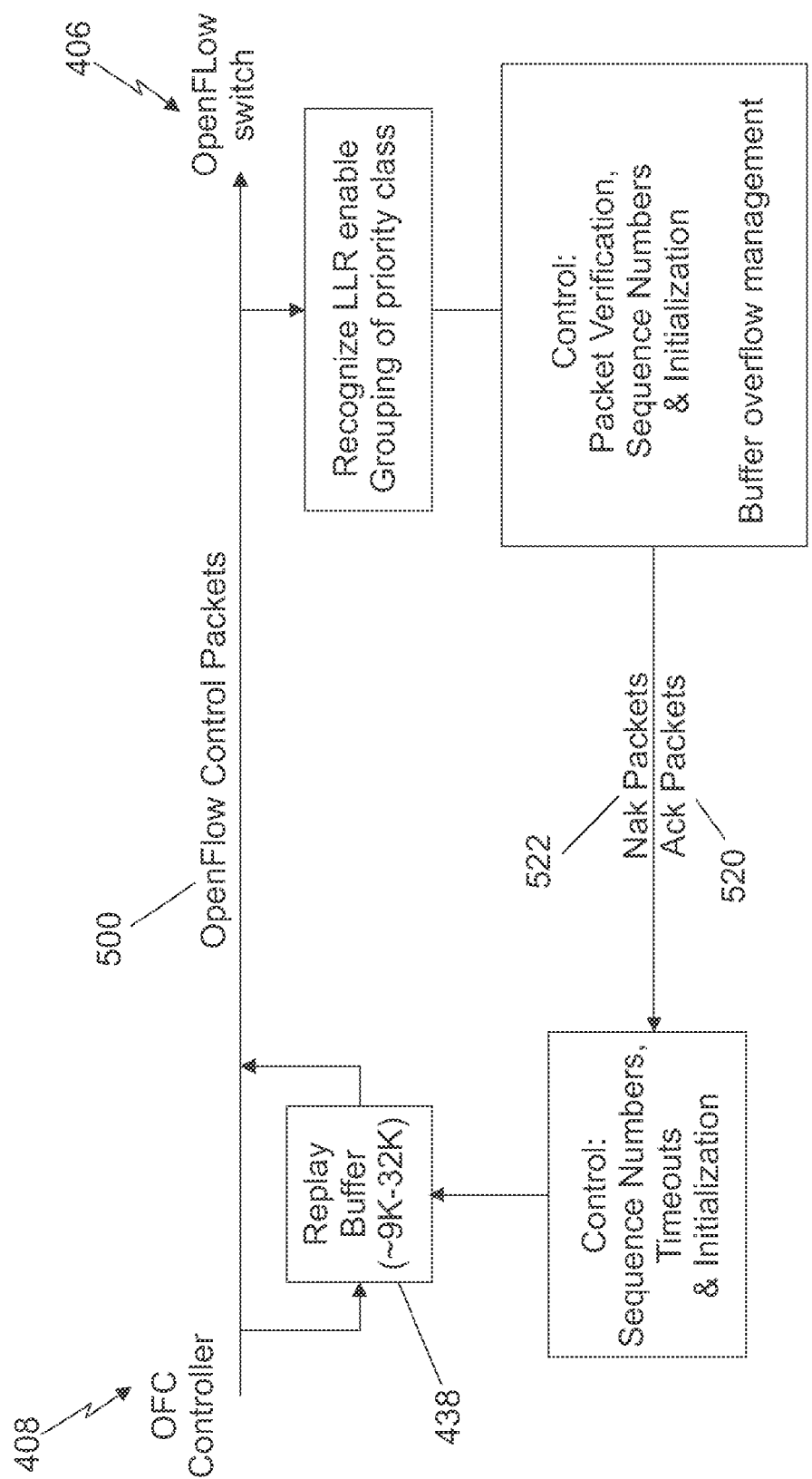
FIG. 7 is a block diagram illustrating an embodiment of the method of FIG. 6.

An embodiment of a method 600 of communication between a switch and a switch controller in a network is described with reference to FIGS. 6 and 7. FIG. 6 is a flow diagram illustrating an exemplary embodiment of the method 600. The method 600 is described in conjunction with the network portion 400 shown in FIG. 4 and the data flow illustration of FIG. 7, but is not so limited. In one embodiment, the method includes the steps represented by blocks 601-607 in the order described. However, in some embodiments, not all of the steps are performed and/or the steps are performed in a different order than that described.

At block 601, the controller 408 receives information or instructions and configures a group of control data packets such as packets 500, which may be configured as OpenFlow control packets. Each control data packet includes link layer retry or link layer reliability (LLR) information including whether LLR is enabled. Other LLR information includes a common traffic class or priority group ID identifying the group of packets and indicating a priority level if desired. The LLR information may also provide additional protocol information such as Ack/Nak codes.

At block 602, each of the control packets 500 are stored in the replay buffer 438 in preparation for transmission to the switch 406.

At block 603, the control packets are sent from the controller 408 to the switch 406.

At block 604, the control data packets are received and verified by the switch 406. The switch 406 checks whether each data packet has been assigned to a group or common traffic class, e.g., by checking the priority group ID, and groups the control packets according to the identified class. The switch identifies the sequence number in each control packet in a respective class, and determines whether any sequence numbers are missing. For example, each packet in the group includes one of a group of sequential integer numbers (e.g., 1-10) and may also indicate the total number of packets. The switch checks the numbers and determines whether any are missing. In one embodiment, if a group is associated with a pre-defined priority or the header indicates a priority for the group, the switch may change the order of processing data in the flow table according to the priority.

At block 605, if all of the data packets and sequence numbers have been verified, the switch 406 sends an LLR reply such as an Ack reply packet 520.

At block 606, if all of the data packets have not been received and validated (e.g., within a selected timeout period), the switch 406 sends an LLR reply such as a Nak reply packet 522. The Nak reply 522 indicates that one or more of the data packets in the identified class or group are missing, and identifies the sequence number of the missing control packet(s).

At block 607, the controller 408 may re-send one or more of the data packets in response to receiving a Nak reply from the switch 406 or expiration of a timeout period. For example, if the controller 408 receives a Nak reply specifying one or more sequence numbers, the controller 408 retrieves the data packets having the specified sequence numbers from the replay buffer 438 and re-sends those packets. If all or some of the packets have not been acknowledged or not been acknowledged with a timeout period, the controller 408 retrieves the unacknowledged packets from the replay buffer and re-sends them to the switch 406.

Technical effects include the ability to rapidly perform data control packet recovery in response to errors in transmission between controllers and switches, and thus improve link layer reliability between controllers and switches. In addition, the embodiments described herein avoid the requirement to surface bit errors to the Ethernet's end-to-end retry mechanism, which reduces end-to-end timeout intervals and false retries due to fabric congestion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for transmission of control data between a network switch and a switch controller, the system comprising:
    a server;
    a switch comprising a port coupled to the server by a link in a network; and
    a centralized switch controller remote from the switch and coupled to the switch by a secure link, the switch controller configured to manage a plurality of network switches including the network switch, and control switch configurations, the switch controller including control logic configured to perform a method comprising:
    configuring a plurality of control data packets by the switch controller, the plurality of control data packets configured for communication between the network switch and the switch controller, the plurality of control data packets configured to be transmitted by the switch controller as a control data packet group in a defined order, the control data packet group configured to control one or more functions related to a configuration of the network switch and/or routing functions of the network switch, wherein configuring includes grouping the plurality of control data packets into the control data packet group and assigning a group identifier to each control data packet header, the group identifier including a sequence number in each of the plurality of control data packets indicating an order of control data packet transmission relative to one or more other control data packets in the control data packet group, the group identifier indicating the control data packet group to which the plurality of control data packets belongs and indicating a total number control data packets in the control data packet group;
    storing the plurality of control data packets in an outbound replay buffer in communication with the switch controller, the outbound replay buffer implemented independent of other buffers and on an outbound path from the switch controller to the switch;
    transmitting the plurality of control data packets to the network switch over a secure link between the switch controller and the network switch; and responsive to determining that one or more control data packets were not received by the network switch, retrieving the one or more control data packets from the outbound replay buffer and re-transmitting the one or more control data packets to the network switch.

2. The system of claim 1, wherein determining includes receiving a response from the network switch indicating that the one or more control data packets were not received, the response including an identification of at least one sequence number associated with each of the one or more control data packets.

3. The system of claim 2, wherein retrieving includes selecting the control data packets stored in the outbound replay buffer based on the at least one sequence number.

4. The system of claim 1, wherein the switch controller is a centralized network controller configured to communicate with and control functions of a plurality of network switches.

5. The system of claim 4, wherein the centralized network controller is configured to establish one or more secure links with the plurality of network switches and transmit the plurality of control data packets to the network switches over the secure link.

6. The system of claim 1, wherein the network switch is an OpenFlow switch and the switch controller is an OpenFlow switch controller.

7. The system of claim 1, wherein the switch controller is coupled to the switch by the secure link that is separate from the link coupling the switch to the server.

8. The system of claim 1, wherein the group identifier indicates a priority level of the common group relative to other types of groups of packets configured to be sent by the switch controller.

9. An apparatus for transmission of control data in a network, comprising:
 a centralized switch controller remote from and coupled to a network switch, the switch controller configured to manage a plurality of network switches including the network switch, and control switch configurations, the switch controller including control logic configured to perform a method comprising:
 configuring a plurality of control data packets by the switch controller, the plurality of control data packets configured for communication between the network switch and the switch controller, the plurality of control data packets configured to be transmitted by the switch controller as a control data packet group in a defined order, the control data packet group configured to control one or more functions related to a configuration of the network switch and/or routing functions of the network switch, wherein configuring includes grouping the plurality of control data packets into the control data packet group and assigning a group identifier to each control data packet header, the group identifier including a sequence number in each of the plurality of control data packets indicating an order of control data packet transmission relative to one or more other control data packets in the control data packet group, the group identifier indicating the control data packet group to which the plurality of control data packets belongs and indicating a total number control data packets in the control data packet group;
 storing the plurality of control data packets in an outbound replay buffer in communication with the switch controller, the outbound replay buffer implemented independent of other buffers and on an outbound path from the switch controller to the switch;
 transmitting the plurality of control data packets to the network switch over a secure link between the switch controller and the network switch; and
 responsive to determining that one or more control data packets were not received by the network switch, retrieving the one or more control data packets from the outbound replay buffer and re-transmitting the one or more control data packets to the network switch.

10. The apparatus of claim 9, wherein determining includes receiving a response from the network switch indicating that the one or more control data packets were not received, the response including an identification of at least one sequence number associated with each of the one or more control data packets.

11. The apparatus of claim 10, wherein retrieving includes selecting the control data packets stored in the outbound replay buffer based on the at least one sequence number identified by the network switch.

12. The apparatus of claim 9, wherein the switch controller is a centralized network controller configured to communicate with and control functions of a plurality of network switches.

13. The apparatus of claim 12, wherein the centralized network controller is configured to establish one or more secure links with the plurality of network switches and transmit the plurality of control data packets to the network switches over the secure link.

14. The apparatus of claim 9, further comprising:
 the network switch, the network switch including switching logic configured to perform:
 receiving one or more of the plurality of control data packets from the switch controller by the network switch over a secure link between the switch controller and the network switch, the at least one control data packet including a sequence number associated with the common group of control data packets having an order of control data packet transmission;
 checking the group identifier and the sequence number of each of the one or more control data packets and determining whether any of the group of control data packets is missing; and
 responsive to determining that any of the group of control data packets is missing, sending a response to the switch controller indicating at least one sequence number associated with each missing control data packet.

15. The apparatus of claim 9, wherein the group identifier indicates a priority level of the common group relative to other types of groups of packets configured to be sent by the switch controller.

* * * * *